United States Patent [19]
Chin

[11] Patent Number: 5,389,777
[45] Date of Patent: Feb. 14, 1995

[54] OPTICAL DISPLACEMENT SENSOR UTILIZING OPTICAL DIFFUSION AND REFLECTION

[76] Inventor: Philip K. Chin, 813 W. William David Pkwy., Metairie, La. 70005

[21] Appl. No.: 100,488

[22] Filed: Jul. 30, 1993

Related U.S. Application Data

[63] Continuation-in-part of Ser. No. 955,932, Oct. 2, 1992.

[51] Int. Cl.⁶ .............................................. H01J 40/14
[52] U.S. Cl. ........................ 250/214 PR; 250/227.21; 250/229
[58] Field of Search ............... 250/221, 227.21, 229, 250/231.13, 214 PR, 561; 341/31, 13

[56] References Cited

U.S. PATENT DOCUMENTS

| | | | |
|---|---|---|---|
| 4,271,354 | 6/1981 | Shellenberger | 250/214 PR |
| 4,320,293 | 3/1982 | Guretzky | 250/214 PR |
| 4,333,009 | 6/1982 | Stevens | 250/227.21 |
| 4,607,160 | 8/1986 | Sakakino | 250/227.21 |
| 4,928,008 | 5/1990 | Huggins et al. | 250/214 PR |
| 4,994,669 | 2/1991 | Stern | 250/229 |
| 5,155,355 | 10/1992 | Kabaya | 250/214 PR |

*Primary Examiner*—Stephone B. Allen
*Attorney, Agent, or Firm*—Keaty & Keaty

[57] ABSTRACT

The invention relates to optical devices, particularly to an optical displacement transducer for detecting a light flow received by a light sensor and subsequent determination of the amount of force applied to an object within which the optical displacement transducer is mounted. The transducer utilizes a light source which is mounted within a housing having a translucent face, and a light sensor mounted in a body having a corresponding translucent face. The light flow which travels between the translucent faces is intermittently blocked by a shadow rod moving between the light source and the light sensor in response to an external force applied to the shadow rod.

51 Claims, 4 Drawing Sheets

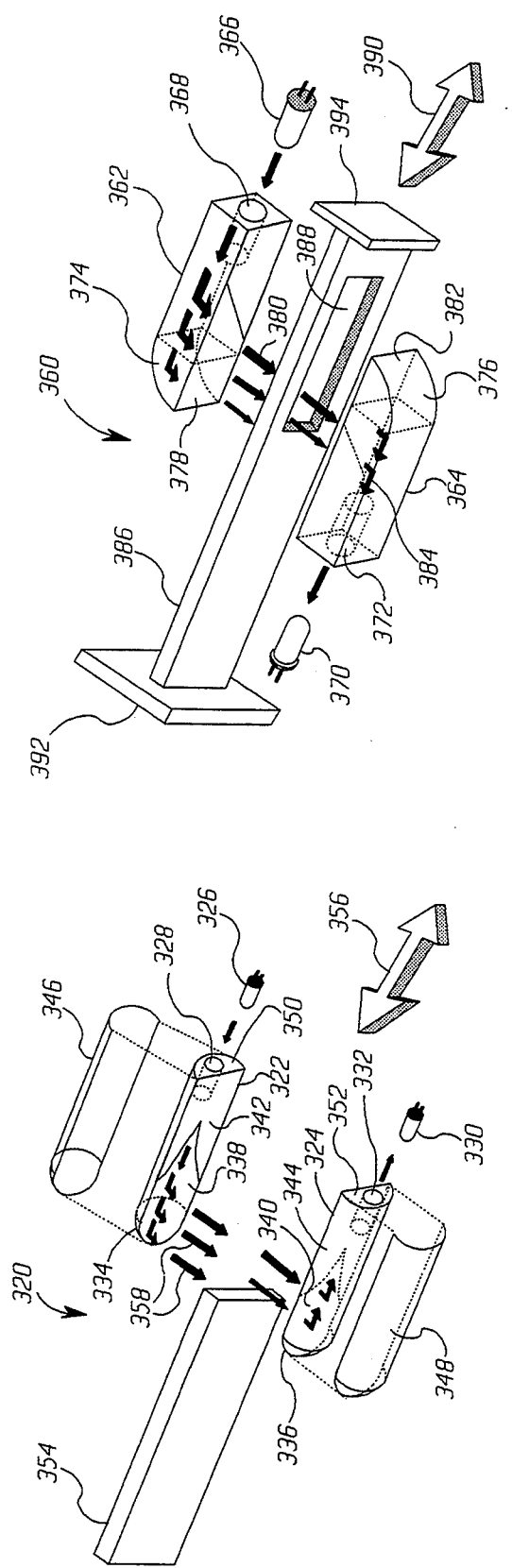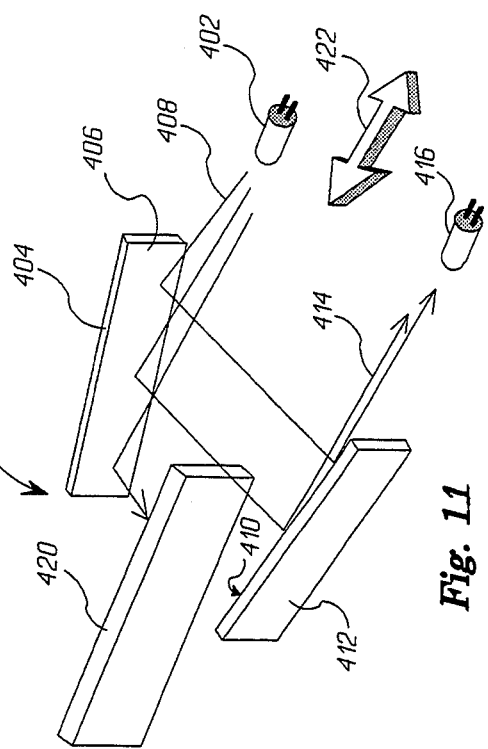

OPTICAL DISPLACEMENT SENSOR UTILIZING OPTICAL DIFFUSION AND REFLECTION

CROSS REFERENCE TO RELATED APPLICATIONS

This application is a continuation-in-part of my co-pending application Ser. No. 955,932, filed on Oct. 2, 1992, entitled "Optical Displacement Sensor", the full disclosure of which is incorporated by reference herein.

BACKGROUND OF THE INVENTION

This invention relates to a displacement sensor for use with robot end effectors in tactile operations, and more particularly to an optical displacement transducer having an improved design for directing the light flow in a desired direction.

In modern technologies, it is most important to use a robot which is capable of determining an object shape through contact. For this purpose, various types of displacement-type transducers have been used, such as electrical transducers, which use various instruments to measure displacement, force transducers, which use a pliable solid to vary a certain electrical current or optical displacement sensors, which measure the amount of light deflected from an object to determine its position. The last mentioned type can find its wide application in, for example, virtual reality systems for receiving the distance or shape information through touch, or the so-called tactile sensing.

Since the optical sensors use light to transmit information, they offer many advantages of electrical transducers, such as high sensitivity, versatility in design and high immunity to electromagnetic interference. Some of the optical displacement sensors use fiber optics to transmit and receive light reflected by an object. In fiber optic sensors, a light emitting diode is used to emit light which is reflected to a phototransistor.

Many other industries utilize optical displacement sensors for performing quality control operations, for example to compare the shape of a "master image" with the article being made; to detect the number of items passing through an assembly line, etc.

The tactile sensors use pairs of emitter/detector hands arranged in arrays of sensors which move in predetermined directions, either in three axial directions, six axial displacements, etc.

The present invention relates to a type of transducer which is used to measure physical contacts made by, for example, robotic hands, with the use of a light beam.

SUMMARY OF THE INVENTION

It is, therefore, an object of the present invention to provide an improved optical-type displacement transducer adapted to better channel the light in the desired direction to thereby insure more precise measurements.

It is another object of the present invention to provide a high accuracy, high sensitivity sensor using the light source and a light sensor for transmitting and receiving a light beam, respectively.

It is a further object of the present invention to provide an optical displacement sensor which is flexible for use in multiple environments and has a large dynamic range.

It is still a further object of the present invention to provide an optical displacement transducer which is durable, reliable and inexpensive to manufacture.

These and other objects of the present invention are achieved through a provision of an optical displacement transducer which, in one of its embodiments, is provided with a flexible shadow rod particularly suitable for use in hard to reach places. The flexible shadow rod allows at least a portion of the rod to travel between the light source and the light sensor to intermittently block the light flow and affect the amount of light reaching the light sensor. The opposite end of the flexible shadow rod can be bent and turned at any angle in relationship to the first end which travels between the light source and the light sensor.

In another embodiment, the optical displacement transducer comprises a housing within which a light source is mounted and a light receiving body within which a light sensor is positioned. The housing and the body each has a translucent face through which the light flow travels. In order to channel the light in the desired direction and improve the direction of the light flow, the ends of the light receiving body and of the light emitting housing, or both, can be made with a curved end wall or an angular wall. In this manner, the light flow changes direction from a substantially longitudinally in relation to the axis of the housing to a direction at an obtuse angle to the original flow.

In still further embodiment, the light emitting housing and the light receiving body are made semi-circular in cross-section with quarter-spherical end wall adjacent the respective translucent faces. All these features facilitate channelling of the light from the light source to the light sensor. While in some of the embodiments the light emitting housing and the light receiving body are positioned in parallel relationship to each other, and the light blocking means moves in a space between them, at least one embodiment provides that the reflective surfaces are formed at an angle to each other, such that the light flow emitted by the light source is reflected from one surface, directed towards another reflective surface and from then on bounces to the light sensor.

An exemplary application of the optical displacement transducer is disclosed in a tactile shadow sensor which can be utilized, for example, in gloves of virtual reality systems. The tactile shadow sensor forms a pressurized enclosure within which the optical displacement transducer is mounted, the enclosure having a flexible, resilient outer capsule which receives the shear force and which forces a shadow rod, moving between two light pipes, to block at least a portion of the light flow to thereby allow detection of the amount and direction of force applied to the capsule.

BRIEF DESCRIPTION OF THE DRAWINGS

Reference will now be made to the drawings, wherein like parts are designated by like numerals, and wherein:

FIG. 9 shows a schematic view of still further embodiment of the device in accordance with the present invention, wherein the light pipes are furnished with covers.

FIG. 10 shows a schematic view of still further embodiment of the device in accordance with the present invention, wherein the light flow is controlled by reversing relative alignment of the light pipes' translucent faces.

FIG. 11 is a schematic view of still further embodiment of the present invention showing an angular reflective shadow sensor.

DETAILED DESCRIPTION OF THE PREFERRED EMBODIMENT

Figure 1:
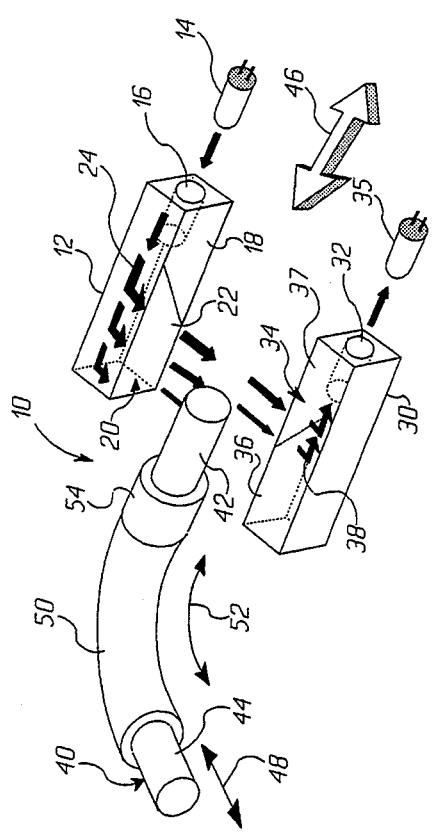
FIG. 1 is a schematic view of one embodiment of the device in accordance with the present invention utilizing a flexible shadow rod.

Turning now to the drawings in more detail, the device of the first embodiment of the present invention is designated by numeral 10 in FIG. 1. The optical transducer comprises a first light pipe 12 which receives a light emitting light source 14 in a chamber 16 formed in one end of the light pipe housing 12. The housing 12 can be shaped as a rectangular solid, cylinder or any other desired shape and be made of a light transparent material, for example, clear acrylic, to allow transmission of light from the light emitting source (for example light emitting diode) 14 exteriorly of the housing body. The exterior surface of the housing 12 is made reflective as for example shown by the darkened area 18 on the face 20 of the housing 12 with the exception of a portion 22 which is made translucent to allow the light beam to exit the light pipe housing 12 in the direction of arrows 24.

A light receiving body 30 is mounted opposite the light pipe 12, the body 30 being a mirror image of the housing 12 and being likewise provided with a chamber 32 for receiving a light sensor, for example a phototransistor, 35 therein. Surface 34 of the body 30 which faces the surface 20 of the light pipe housing 12 is made partially translucent, particularly in the portion 36 to allow the light beam to enter the body 30 and be directed, in the direction of arrows 38, to the light sensor 35.

The remainder exterior surface of the light pipe 30 is made reflective to insure channelling of the light in the desired direction from the light source 14 to the light sensor 35. To make the exterior surface of the light pipes 12 and 30 reflective, the surface can be covered with metallic stickers. The light source 14 can be an infrared light emitting diode, while the light sensor 35 can be an infrared phototransistor.

Moving between the light pipes 12 and 30 is a flexible shadow rod 40 having a first end 42 and a second end 44. The shadow rod 40 can be bent and pointed in a different manner, can be made of different shapes to control the light curve output. The amount of light transmitted from the light source 14 and received by the light sensor 35 will depend on the position of the end 42 of the shadow rod 40, since the end 42 will intermittently block at least some of the light by moving between the translucent faces 22 and 36. The end 42 moves in the direction of arrow 46 in generally parallel relationship to a longitudinal axis of the light pipes 12 and 30, while the end 44 moves in the direction of arrow 48, which is somewhat angular, if not perpendicular, to the direction of movement of the end 42.

An optional shadow rod sleeve 50 is mounted over the shadow rod 40 to assist in retaining the rod 40 in a desired shape. In the embodiment shown in FIG. 1, the shadow rod is formed in the shape of a cylinder positioned within a cylindrical shadow rod sleeve 50, which is curved to allow movement of the rod within the sleeve in the direction of arrow 52. A fixed collar 54 is secured to the flexible rod 40 adjacent the end 42 to limit the movement of the shadow rod 40 within the sleeve 50.

Both the shadow rod 40 and the sleeve 50 can be made from materials similar to those utilized for manufacturing of the light pipes 12 and 30, and can be acrylic, plastic, nylon, etc. It is envisioned that the flexible shadow rod 40 can be even made from a fishing line.

The translucent faces 22 and 36 can be prepared by making the surface "rough" for the purposes of somewhat diffusing the light beam travelling from the light source 14 to the light sensor 35.

Alternatively, to produce the translucent, or light diffusive faces on the light pipes 12 and 30, a piece of "Scotch Magic" TM tape manufactured by 3M Corporation can be placed on those sides of the light pipes which emit and receive the light. Since the tape is somewhat translucent, the light will travel down the light pipe housing 12 and be directed toward the light sensor body 30, then towards the sensor 35. It is possible to apply a certain ink or paint to form the reflective portions 18 and 37 of the light pipes 12 and 30, respectively and then apply the tape to the entire faces 20 and 34 and then use The other surfaces of the light pipes 12 and 30 can be likewise covered with the painted tape to produce the desired reflective surface effect. Black or other colors can be used to adjust the amount of light travelling between the light pipes 12 and 30 and thereby effect the signal curve output due to the difference in light reflectivity between the colors. In a similar manner, the density or thickness of the paint can also be used to adjust the signal curve output of the device 10. It is envisioned that certain designs can be printed on the tape prior to its positioning on the light pipes 12 and 30, so that a linear signal curve output is produced by the optical sensor 10.

As will be appreciated, the sensor 35 is connected to a measuring device (not shown) suitable to interpret the amount of light received by the phototransistor 35 to a quantitative data and assist in the operation of a robotic hand (not shown).

Figure 2:
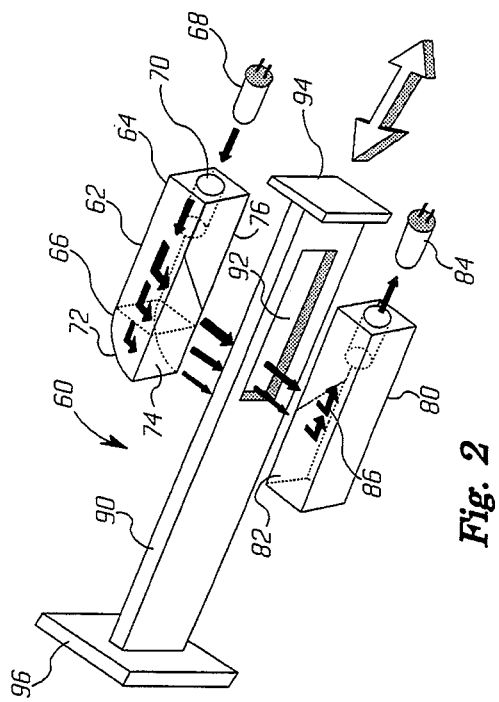
FIG. 2 is a schematic view of another embodiment of the device in accordance with the present invention having a curved end on the light source light pipe.

Turning now to FIG. 2, another embodiment of the device in accordance with the present invention is schematically illustrated. As shown in FIG. 2, an optical transducer 60 comprises a first light pipe 62 having a first end 64 and a second end 66. A light source, for example a light emitting diode 68 is mounted within the chamber 70 formed in the end 64. The end 66 is curved, forcing the light beam to "bounce off" the curved wall 72 and exit the housing 62 through a translucent face 74. Since all other surfaces of the light pipe housing 62 are made reflective, including the portion 76 of the light pipe 62, the light beam will be forced to travel first in the direction of longitudinal axis of the light pipe 62 and then curve, when reaching the wall 72.

Mounted opposite the light pipe 62 is a light receiving light pipe, or body 80 which can be formed in the shape of a solid rectangle, if desired, and which is provided with a translucent face 82 through which the light beam enters the body 80. Mounted in the end of the body 80 distant from the face 82 is a light sensor 84, which can be an infrared phototransistor adapted to receive the light travelling in the direction of arrows 86 through the light pipe body 80.

Similarly to the housing 62, the remaining surfaces of the body 80 are made reflective, insuring the desired direction of travel of the light beam from the source 68 to the sensor 84.

Moving in a substantially parallel relationship between the light pipes 62 and 80 is a shadow rod 90 which is provided with a rectangularly shaped window 92 in one of its ends. The remainder of the shadow rod 90 is made solid, so that the light beam travelling from the housing 62 to the body 80 will be intermittently blocked, while a portion of the beam may be allowed to travel thought the window 92. By measuring the amount of light received by the sensor 84, the distance of movement of the shadow rod 90 can be determined. Fixedly attached to the opposite ends of the shadow rod 90 are a pair of end plates 94 and 96 which are used for transmitting directional force to the movement of the shadow rod 90.

If desired, the end 66 of the light pipe 62 can be shaped as a parabolic curve to further change the direction of the light beam travelling between the light source 68 and the light sensor 84. The translucent surfaces 74 and 82 can be prepared as described above in relation to the embodiment of FIG. 1.

Figure 3:
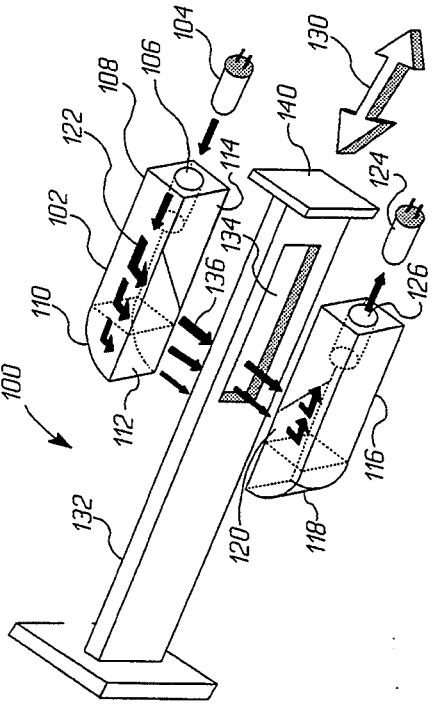
FIG. 3 is a schematic view of still another embodiment of the device in accordance with the present invention, wherein both light pipes are provided with curved ends.

Turning now to FIG. 3, still another embodiment of the optical displacement transducer in accordance with the present invention is schematically illustrated. As shown in FIG. 3, the optical transducer 100 comprises a light emitting pipe 102 having a light source 104 positioned within a chamber 106 which is formed in the end 108 of the housing 102. The opposite end of the light pipe 102 is provided with a curved exterior wall 110, so as to turn the light direction at the curved wall and allow the light beam to exit the light pipe 102 through a translucent face 112. The remainder of the housing surface, is made reflective, for example by covering by a metallic sticker portion 114, similar to the embodiments described above.

Mounted opposite the light pipe 102 is a light receiving pipe 116 which has a similarly curved end wall 118 formed at one end of a generally rectangular solid light pipe 116. A translucent face 120 is made on the portion of the exterior surface of the light pipe 116 which faces the light pipe 102 and is directly opposite the translucent face 112 of the light emitting pipe 102. The light beam travels from the light source 104 in the direction of arrows 122, turns at the wall 110, is received through the translucent face 120 in the light pipe 116, then turns at the wall 118 and travels thorough the body 116 to be received by a light sensor 124 mounted in the chamber 126 of the light pipe 116.

Travelling between the light pipes 102 and 116 in the direction of arrow 130 is a shadow rod 132 which is formed with a rectangularly shaped window 134 adjacent one end thereof. The body of the shadow rod 132 is non-permeable to light, so that when the shadow rod is in a position, for example, illustrated in FIG. 3, at least a part of the light beam will be blocked. The remainder of the light beam will travel to the light sensor 124 as shown by arrows 136. Depending on the amount of light detected by the sensor 124, an external light measuring device translates the data into a readable form which indicates the distance traveled by the shadow rod 132 when a force is applied to, for example, end plate 140 attached to the shadow rod 132.

As will be appreciated, the embodiment of FIG. 3 allows redirecting of the light towards the light sensor 124 in a manner which will effect the output signal. If desired, the ends having the curved walls 110 and 118 can be formed in the shape of a parabolic curve in order to better channel the light in the desired direction.

Similarly to the earlier described embodiments, the remainder surfaces of the light pipes 102 and 116 are covered with reflective adhesive film, if necessary, to prevent diffusion of the light from the pre-selected direction.

Figure 4:
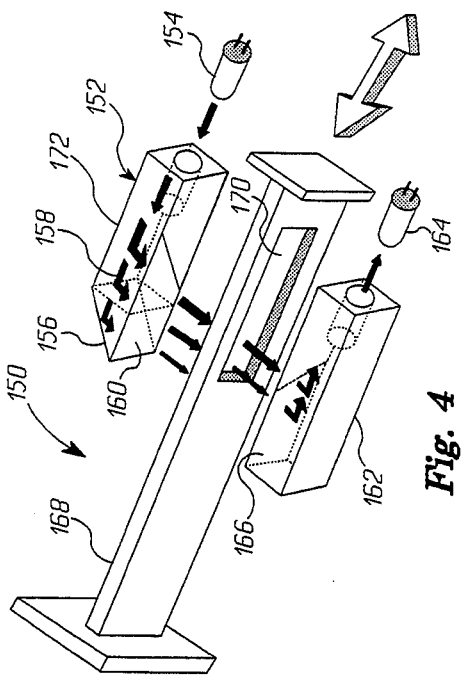
FIG. 4 is still another embodiment of the device in accordance with the present invention, wherein the light source light pipe is furnished with an angled end.

Turning now to FIG. 4, or still further embodiment of the device in accordance with the present invention is shown as designated by numeral 150. The optical transducer 150 comprises a light pipe 152 which houses a light emitting source 154 and which is provided with an angularly cut end 156 to effect directing the light beam at an angle to a longitudinal axis of the housing 152. The light beam will travel in the direction of arrows 158, then through the translucent face 160, turning at an angle when reaching the wall 156.

A light receiving pipe 162 which houses a light sensor 164 receives the directed light through the translucent face 166 and channels the light towards the light sensor 164. Similarly to the above described embodiments, a shadow rod 168 travels between the light pipes 152 and 162, intermittently blocking the light beam, while allowing a portion thereof to travel through the window 170 towards the sensor 164.

The angled end 156 is similar to a prism used to channel the light. It is preferred that the length of the angled wall 156 be shorter than the length of the elongated wall 172 of the light pipe 152.

Figure 5:
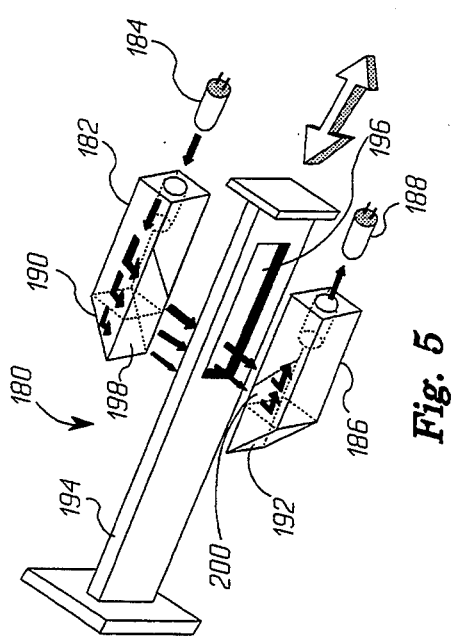
FIG. 5 is a schematic view similar to the view of FIG. 4, but wherein both light pipes are furnished with angled ends.

Shown in FIG. 5 is still another embodiment of the device in accordance with the present invention generally designated by numeral 180. The optical transducer 180 comprises a first light pipe 182 housing a light emitting source 184 in one of its ends. Mounted opposite the housing 182 is a light receiving pipe 186 which houses a light sensor 188. As can be seen in the drawing, the ends 190 and 192 of the light pipes 182 and 186, respectively, are formed at an angle to the longitudinal axes of their respective light pipes and are similar to a prism used to channel the light in a desired direction. It is preferred that the length of the walls 190 and 192 be shorter than the length of the remainder portion of the light pipes 182 and 186.

A shadow rod 194 having a window 196 formed in one end thereof travels between the translucent faces 198 and 200 of the light pipes 182 and 186, respectively, intermittently blocking at least a part of the light beam travelling from the source 184 to the sensor 188 during operation. The angled walls 190 and 192 assist in channelling the light towards the light sensor 188. Similarly to the previously described embodiments, the remainder surfaces of both light pipes 182 and 186 are made reflective, so as not to interfere with the channelling of the light through the translucent faces 198 and 200.

Figure 6:
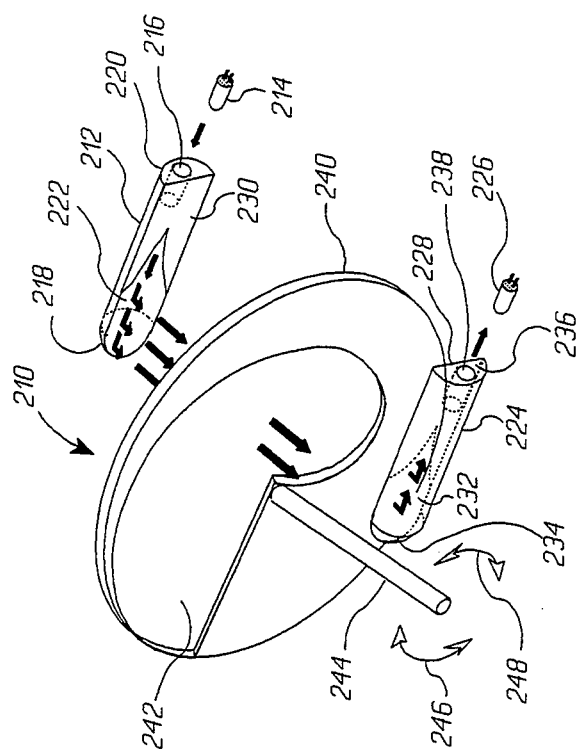
FIG. 6 is a schematic view of still further embodiment of the device in accordance with the present invention, wherein the translucent faces are modified in shape and the ends are made quarter-spherical.

Turning now to the embodiment of FIG. 6, a rotational shadow sensor 210 is illustrated. The optical transducer 210 comprises a light emitting pipe 212 having a light emitting source 214 housed within a chamber 216 in one of its ends, and having a quarter-spherical wall 218 formed at its opposite end. The housing 212 is semi-circular in cross-section, with the end 220, which houses the light source 214, being flat. A translucent face 222 is formed on a flat, non-curved surface 230 of the light pipe 212, the face 222 being irregularly shaped to further affect the output curve of the signal transmitted from the translucent face 222 towards the light receiving body 224 within which a light sensor 226 is housed. The body 224 is a mirror image of the housing 212 and is likewise semi-circular in cross-section, having a flat surface 228 which faces the flat surface 230 of the housing 212. The flat surface 228 is formed with a translucent face 232 which is, similarly to the face 222, irregular in shape.

The body 224 is formed with a rounded end 234, which can be quarter-spherical in shape, and has a flat end 236 within which a chamber 238 is formed to house a light sensor 226. If desired, both ends 218 and 234 can be shaped as a parabolic curve in order to better channel the light in the desired direction. While the faces 222 and 232 are made translucent, the other portions of the flat surfaces 228 and 230 can be made transparent in order to achieve a total internal reflection within that section of the light pipes 212 and 224. Moreover, the non-translucent portions can be transparent and have a spherical fiber optic cladding in order to still better channel the light in the desired direction. Thus, a number of methods can be used to further control the light flow and produce a more efficient flow for a linear signal output. The use of the curved ends 218 and 234 allows to turn the light flow along the curved ends and re-direct it at an arc after and before a generally axial movement within the light pipes 212 and 224, respectively.

Rotationally mounted between the faces 228 and 230 of the light pipes 212 and 224 is a shadow disk 240 which can be circular or oval in shape and which is formed with a spiral-shaped window 242 through which the light beam travels from the face 222 towards the face 232. The disk 240 carries a fixedly attached support 244 to which the torque is imparted in the direction of arrows 246 and 248.

When the window 242 is fully aligned with the faces 222 and 232, almost no impediment is formed for the transmission of the light beam from the source 214 to the sensor 226. However, when a slight rotational movement is imparted on the support 244, the window 242 becomes misaligned with the faces 222 and 232, causing at least a portion of the light beam to be blocked by the solid body of the disk 240. Based on the reduced amount of the light received by the sensor 226, measurements can be made on the amount of rotation imparted on the instrument of which the transducer 210 forms a part.

Figure 7:
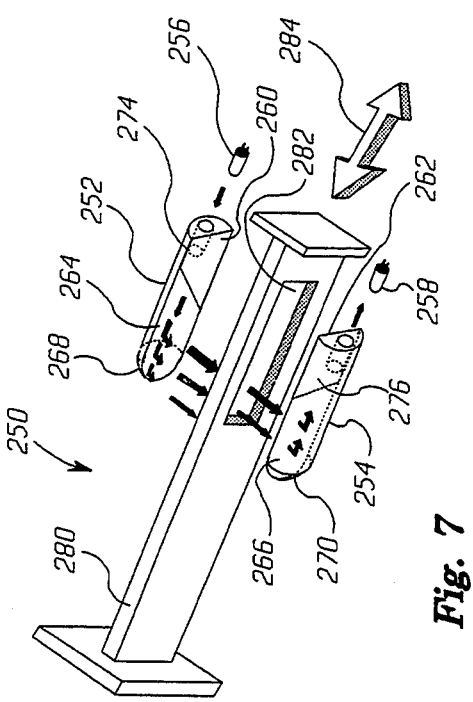
FIG. 7 shows a schematic view of still another embodiment of the device of the present invention, with both light pipes having quarter-spherical ends.

FIG. 7 illustrates still further embodiment of the transducer in accordance with the present invention which is generally designated by numeral 250. The transducer 250 also comprises a pair of light pipes 252 and 254 adapted to receive a light source 256 and a light sensor 258, respectively. Similarly to the embodiment of FIG. 6, the light pipes 252 and 254 are formed as semi-cylindrical bodies having a semi-circular cross-section and flat front walls 260 and 262. A part of each of the walls 260 and 262 is occupied by translucent faces 264 and 266 which are aligned opposite each other and which are formed adjacent to the curved walls 268 and 270 of the light pipes 252 and 254, respectively. The curved walls 268 and 270 change the direction of the light flow from a generally straight axial to a curved path. The remainder surfaces of the walls 260 and 262 are occupied by reflective portions 274 and 276 which allow to direct the light only through the translucent faces 264 and 266.

Moving linearly between the walls 260 and 262, in generally parallel relationship thereto, is a shadow rod 280 which is provided with a window 282 adjacent one end thereof, the window allowing transmission of the light from the light source 256 to the light sensor 258. During movement of the rod 280 in the direction of arrow 284, at least a portion of the light flow is blocked. The amount of light will therefore be reduced and this amount of light, detected by sensor 258, will be interpreted by an external computer or other electronic means to give information on the amount of movement made by the rod 280 in response to contact of, for example, a robotic hand with a hard surface.

The photo-spherical walls 268 and 270 can be shaped with any desired radius or can be made in a shape of a parabolic curve in order to better channel the light in the desired direction. The remainder surfaces of the light pipes 252 and 254, with the exception of the faces 264 and 266, can be covered with a reflective film to insure that the light is directed only through the translucent faces without diffusion.

Figure 8:
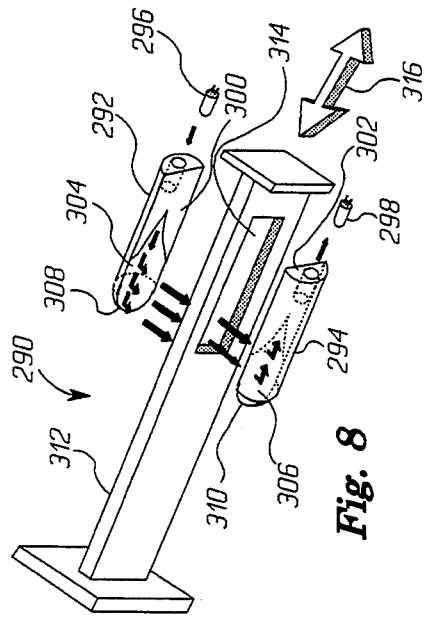
FIG. 8 is a schematic view of another embodiment of the present invention showing modified translucent faces and quarter-spherical ends of the light pipes.

Turning now to the embodiment of FIG. 8, still further variation of the optical transducer is disclosed. The transducer 290, similarly to the embodiments of FIGS. 6 and 7, comprises a pair of generally semi-cylindrically shaped light pipes 292 and 294 which house a light source, for example a light emitting diode 296 and a light sensor, for example an infrared phototransistor 298, respectively. The light pipes 292 and 294 are formed with curved exterior walls and flat front walls 300 and 302 of the light pipes 292 and 294, respectively. The walls 300 and 302 are each formed with translucent faces 304 and 306, the faces being irregularly shaped to thereby effect the output curve of the signal sent to an external computer by the sensor 298. The other portion of the flat walls 300 and 302 can be made transparent in order to achieve a total internal reflection with that section of the light pipes 292 and 294. Moreover, the non-translucent portion can be transparent and have a special fiberoptic cladding (not shown) covering the non-translucent portion in order to channel the light in the desired direction. Thus, a number of methods can be used to further control the light flow and produce a more efficient light flow for a linear signal output.

Distant ends 308 and 310 of the light pipes 292 and 294, respectively, are made quarter-spherical, forcing the light to turn in the desired direction and move towards the light sensor 298. A shadow rod 312 having a window 314 made therein is mounted between the flat walls 300 and 302, the shadow rod moving in the direction of arrow 316, intermittently blocking the light flow, or at least a portion thereof, from the light source 296 to the light sensor 298.

FIG. 9 illustrates still another embodiment of the device in accordance with the present invention which is generally designated by numeral 320. The optical transducer 320 comprises a semi-cylindrical light emitting pipe 322 and a semi-cylindrical light receiving pipe 324. The housing 322 receives a light source, for example an infrared light emitting diode 326 in a chamber 328 formed in one of its ends, and the light pipe housing 324 receives a light sensor, for example an infrared phototransistor 330 in a chamber 332 made in a similar flat end of the body 324. The opposing ends of the light pipes 322 and 324 are made curved, having quarter-spherical walls 334 and 336 which assist in channelling the light from the light source 326 to the light sensor 330.

The flat walls 322 and 324 are each provided with a respective translucent face 338 and 340, respectively, through which the light travels from the housing 322 into the body 324. The remainder surfaces 342 and 344 of the flat walls is made reflective, to assist in directing the light. In the alternative, the surfaces 342 and 344 can be made transparent in order to achieve a total internal reflection within that section of the light pipe. Moreover, the non-translucent portion can be transparent and have a special fiber-optic cladding (not shown) covering the non-translucent portion in order to channel the light in the desired direction. Still in the alternative, the surfaces 342 and 344 can be made opaque, if desired. As will be appreciated by those skilled in the art, a number of methods can be used to further control the light flow to produce a more efficient light flow and a linear signal output.

As an option, both light pipes 322 and 324 can be equipped with covers 346 and 348 which can be white in color or have a translucent surface. The covers can also have a solid or gradient pattern with a black or light absorbing color in order to adjust the signal curve output. If desired, the covers can be fixedly attached to their respective light pipes 322 and 324. Each cover 346 and 348 is curved at a radius substantially similar to the radius of curvature of exterior walls of the light pipes 322 and 324, so as to completely cover the curved surfaces, including the curved ends 334 and 336. As can be seen in the drawings, the covers generally has a trough shape and do not cover the flat ends 350 and 352 of the light pipes 322 and 324, respectively. The covers also do not cover the flat front walls of the light pipes 322 and 324, leaving the translucent faces 338 and 340 free from obstruction.

A solid shadow rod 354 moves in a substantially parallel relationship to longitudinal axes of the light pipes 322 and 324, intermittently blocking the faces 338 and 340, thereby interrupting, at least in part, a full flow of light from the light source 326 to the light sensor 330. Based on the amount of light received by the light sensor, the distance of travel of the shadow rod 354 can be determined. Arrow 356 illustrates the direction of movement of the shadow rod 354, while the arrows 358 show the direction of light flow from the light source 326 to the light sensor 330.

Shown in FIG. 10 is a schematic view of an optical displacement transducer 360 which, similarly to the previously described embodiments, comprises a pair of light pipes 362 and 364, with the housing 362 receiving a light source 366 in a chamber 368, and with the body 364 receiving a light sensor 370 in the chamber 372 thereof.

The ends opposite the chambers 368 and 372 are curved as shown at 374 and 376, so as to produce a generally Z-shaped light flow. The light generated by the light source 366 flows substantially along the longitudinal axis of the housing 362, turns at the curved wall 374, proceeds perpendicularly to the original flow out of the housing 362, through the translucent face 378 in the direction of arrows 380, and enters the body 364 at that end of the body which is adjacent to the curved wall 376, through a translucent face 382. The light beam then turns, following the curvature of the wall 376, and then follows substantially longitudinally through the body 364 in the direction of arrows 384, towards the light sensor 370.

This effect can be achieved by reversing the orientation of one of the light pipes 362 or 364 with respect to the other housing. The Z-shaped light flow results in a more linear signal output curve, since the light output is greater nearer the light source and the light sensitivity is greater nearer the light sensor. This effect can be produced using any of the embodiments illustrated in FIGS. 1-9, that is with any optical transducer that uses at least two (2) light pipes or light housings.

In addition, when using the Z-shaped light flow, the position of the light pipes with respect to the longitudinal axis can be adjusted, so that there is a complete overlap or partial overlap between the light pipes. This position can be chosen to maximize the light output or adjust the shape of the signal output curve. The amount of overlap for the light pipe used in the rotational sensor shown in FIG. 6, can also be adjusted in order to achieve the desired output signal curve.

Moving in a parallel relationship between the translucent faces 378 and 382 is a shadow rod 386 which, as in a number of previously described embodiments, is provided with a rectangularly-shaped window 388. The window 388 is intermittently aligned with the reflective faces 378 and 382 to allow the light flow to travel therethrough. Since the shadow rod 386 has a solid non-transparent body, and it moves generally in the direction of arrow 390, it will intermittently block at least a part of the light flow which travels in the direction of arrows 380, thereby effecting the amount of light detected by the sensor 370. By translating the amount of light flow into the linear data, the distance of travel of the shadow rod 386, in response to application of force through the end plates 392 and 394, can be determined.

FIG. 11 illustrates still a further embodiment of a device in accordance with the present invention, wherein an optical displacement transducer 400 is schematically illustrated. In this embodiment, the light source 402 is positioned a distance away from a body 404 which has a light diffusive or reflective surface 406. The light flow moves in the direction of arrows 408 and "bounces off", or reflects from the surface 406, moving at approximately a right angle in relation to the original light flow path until it reaches a diffusive or reflective surface 410 which is formed on the face of a body 412. The body 412 is mounted opposite the body 404. The light flow reflects from the surface 410, changes its direction and travels in the direction of arrow 414 towards the light sensor 416. As can be seen in FIG. 11, the bodies 404 and 412 are mounted at an obtuse angle in relation to each other, so as to further facilitate reflecting of the light beam from the surfaces 406 and 410.

It should also be noted that the bodies 404 and 412 can have a curved end which is located on the end farthest away from the light source 402 and the light sensor 416. This is similar to embodiments shown in FIGS. 2–10 with respect to redirecting and channelling the light flow.

Moving between the bodies 404 and 412 is a solid body as shadow rod 420 which moves in the space approximately equidistant from the bodies 404 and 412 in the direction of arrow 422, intermittently blocking all or some of the light reflected from the surface 406 towards the surface 410. If desired, the body 420 can be made with a window as illustrated in the previous embodiments of this invention. As in all previous embodiments, the light source 402 can be, for example, an infrared light emitting diode, while the light sensor can be an infrared phototransistor.

While the embodiments described above show the reflective or translucent surfaces covering part or entire face of the light translucent surface, a radiant translucent surface can be achieved along the length of the light pipes, or light housings. This type or radiant translucent surface can vary from total internal reflection near the light source or light sensor (for each light pipe) to a diffusive, translucent surface located farthest away from the light source or light sensor, respectively. This design approach can be used for adjusting the signal output curve of the shadow sensor by more effectively channelling the desired amount of light from the emitter housing to the receiver housing along the length of each housing. The translucent-reflective surface can have a gradient such that a signal output curve of the sensor is linear. This gradient surface is similar to that used in glass objects that vary amount of light entering the objects at different points.

Alternatively, an opaque or partially opaque gradient pattern printed along a clear transparent surface (a gradient shadow rod) can be used. As a result, it will be possible to control the shape of the signal output curve of the optical displacement transducer. The transparent surface is made a part of the shadow rod in order to control the amount of transmitted light by varying position of the rod with respect to the light housings. The shadow rod with a gradient transparency can be made, for example, of the same material as a transparency paper, similar to the transparency material used for overhead projections. The shadow rod can be similarly made of "Lexon" TM or any other light permeable material. The gradient pattern can be printed on the surface or manufactured within a gradient shadow rod.

As a variation, the gradient shadow rod can have a pattern printed on a certain section of the shadow rod, while the other section can be made totally opaque to light. This combination of a gradient section and an opaque section, both made on the body of the shadow rod, can change the signal output curve of the optical transducer. The shape of the signal output curve resulting from the gradient shadow sensor can be linear, exponential, etc. The gradient shadow rod can reduce the amount of off-axis play that can effect output signal of the light sensor, while the gradient pattern can be adjusted to vary along the displacement axis of the shadow sensor only. Additionally, by choosing a certain gradient pattern, one can decrease or increase the displacement range of the sensor. The gradient pattern can be made to vary in any direction on the shadow rod in order to produce a desired signal output curve. All these methods can be used in designing and manufacturing optical displacement transducers of the embodiments illustrated in FIGS. 1–11.

Figure 12:
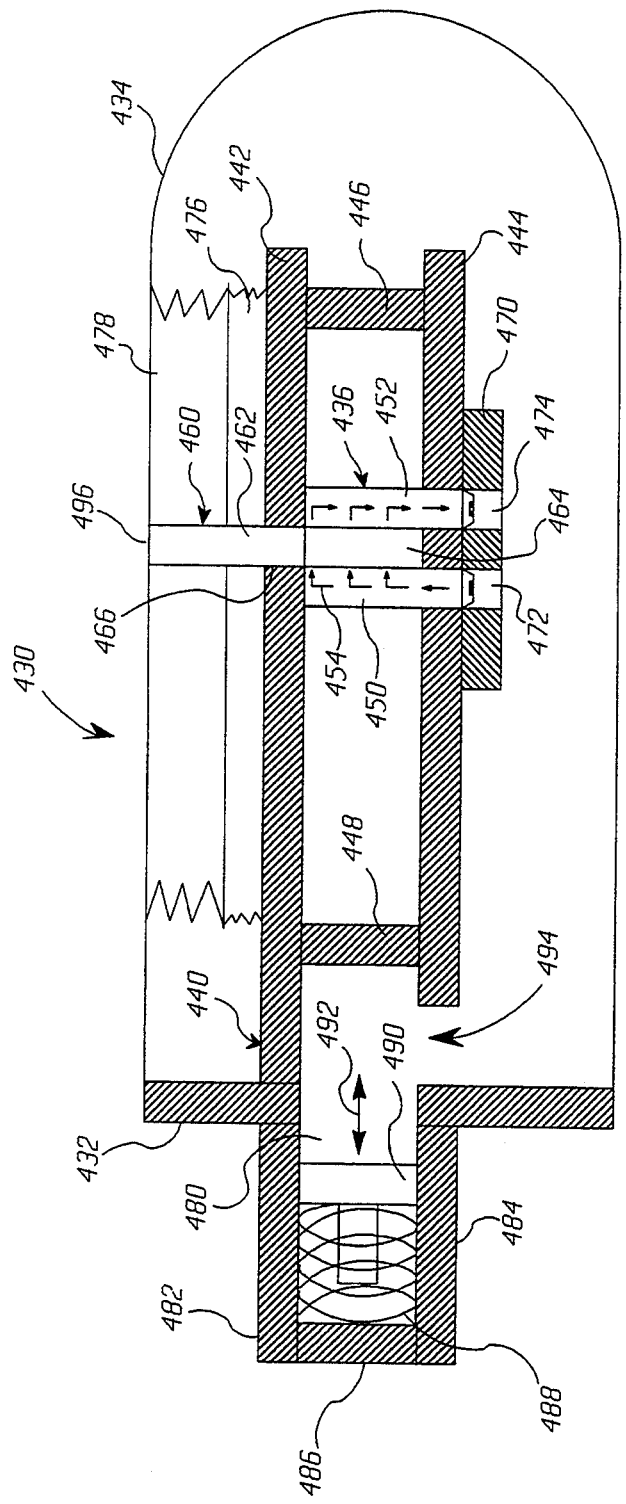
FIG. 12 is a schematic view showing a tactile shadow sensor which incorporates an optical displacement transducer of the present invention.

FIG. 12 schematically illustrates an exemplary application of optical displacement transducers of FIGS. 1–11 in a tactile shadow sensor 430. The sensor comprises a rigid frame 432 which can be made of steel, aluminum, carbon fiber, ceramic, titanium, composite material, etc. Mounted on the frame 432 and securely attached thereto is an outer skin, or capsule 434 which forms an air-tight enclosure for an optical transducer 436. The interior of the sensor is fluidly pressurized with gas or liquid. The capsule enclosure 434 can be made of silicon or other plastic material which is thin and flexible enough to resemble a human skin.

Extending inwardly from the outer frame 432 is a rigid support frame 440 comprising a pair of parallel bars 442 and 444. The bars 442 and 444 are retained in a spaced-apart relationship by a pair of parallel spacers 446 and 448. Secured to the bars 442 and 444 are a pair of light pipes 450 and 452, with the housing 450 acting as a light emitting body, and the body 452 acting as a light receiving body. The light travels between the light pipes 450 and 452 in the direction of arrows 454 continuously sending a light flow unless interrupted by movement of a shadow rod 460.

The shadow rod 460 is divided into two sections: opaque, designated by numeral 462, and a transparent, designated generally by numeral 464. Although not shown in FIG. 12, the bar 444 is formed with an opening, similar to the opening 466 in the bar 442, to allow the shadow rod 460 to travel between the light pipes 450 and 452 blocking the light flow from the housing 450 to the body 452. The shadow rod 460 can be made of a fishing line, if desired, and the opaque and transparent sections 462 and 464 can be switched places to provide zero or full signal output when the sensor 430 is at full extension, that is fully pressurized to resemble a human finger. To retain a proper alignment between the light pipes 450, 452 and the shadow rod 460, a securing plate, for example silicon wafer 470, is fixedly attached to the outer surface of the bar 444. Suitable openings 472 and 474 are made in the plate 470 to allow positioning and securing of the light pipes 450 and 452 within the sensor 430.

Secured to the plate 442 is a first flexible layer 476 which can be made of silicon, rubber, "sorbothane" TM, polyurathane, etc., and a second resilient flexible layer 478 which is attached to the first layer 476 along substantially entire length thereof. The layers 476 and 478 can be made of an open cell foam material to provide an elastomeric resilience to the sensor 430.

The frame 432 is generally cup-shaped and has an inner space 480 formed between two parallel plates 482 and 484. The plates 482 and 484 are retained in a spaced apart relationship by an end plate 486 which encloses the space 480 at one end.

Mounted between the plates 482 and 484 is a tension spring means 488 which abuts the end plate 486 at one of its ends and which is kept in a compressed condition by a piston 490. The piston 490 moves within the space 480 in the direction of arrow 492. The space 480 communicates with the interior of the sensor 430 through a passageway 494. A pressurized fluid, gas or liquid, enters the space 480 and acts on the outer surface of the piston 490 compressing the spring 488. The spring loaded piston 490 is used to vary and maintain the pressure within the tactile sensor 430, while the pressurized environment assists in returning the shadow rod 460 to a fully extended position after an applied force is withdrawn from the enclosing skin, or capsule 434.

When pressure is applied to the outer skin 434, the flexible layers 476 and 478 compress the fluid inside the sensor 430, forcing the piston 490 to compress the spring 488. At the same time, the shadow rod 460 moves inwardly, due to the pressure applied to its outermost end 496. By reacting to the compressive force of contact applied to the outer end 496, the shadow rod 460 will block some or all of the light flow travelling between the light pipes 450 and 452. By interpreting the amount of light detected by the sensor in the body 452, the direction and shear force can be calculated.

Figure 13:
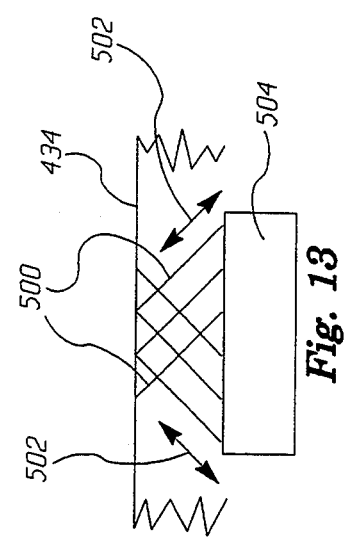
FIG. 13 is a schematic cross-sectional view illustrating application of the optical displacement sensor shown in FIG. 12.

Even though one shadow sensor 460 is shown for illustration purposes in FIG. 12, it will be appreciated that more shadow sensors can be employed to provide information from various points along the parameter of the encapsulating skin 434. One example of a multiple shadow rod array is shown in FIG. 13, wherein the shadow rods are schematically designated by numeral 500. As can be seen in the drawing, the rods 500 travel at an angle to the outer skin or capsule 434 in the direction of arrows 502 blocking some or all light within the array, or set of sensors 504. The set 504 houses the light pipes, including light emitting pipes and light receiving pipes, light sources and light sensors. The arrangement of FIG. 13 can be successfully used to detect shear forces along the surface of the skin 434.

Figure 14:
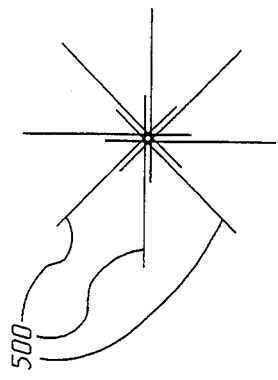
FIG. 14 is a plan view of angled shadow rods used to detect direction and the magnitude of shear forces along a skin surface.

FIG. 14 illustrates a plan view of angled shadow rods 500 which can be positioned as shown in a star-like fashion to detect the direction and the magnitude of the shear forces acting on the skin surface. By using the sensors output, the position of the angled and non-angled shadow rods, trigonometry, direction and magnitude of shear forces acting upon the skin surface can be determined.

While only some of the embodiments of the basic concept of the invention have been illustrated, it will be understood that many other changes and modifications can be made within the design of the present invention without departing from the spirit thereof.

I, therefore, pray that my rights to the present invention be limited only by the scope of the appended claims.

I claim:

1. An optical displacement transducer, comprising:
  a light emitting means for emitting a light flow comprising a light emitting housing having an internal chamber formed therein, a light source positioned inside the chamber, and a translucent face formed in a portion of the light emitting housing for channelling the light flow from the light emitting housing;
  a light receiving means for receiving the light flow mounted opposite the light emitting housing, said light receiving means comprising a light receiving body having an internal chamber formed therein for retaining a light sensor, said light receiving body being provided with a translucent face in a portion thereof which is oriented in a substantially parallel relationship to the light emitting housing translucent face; and
  a light blocking means for intermittently blocking the light flow between the light source and the light sensor and for varying the amount of light reaching the light sensor, said light blocking means comprising a flexible shadow rod having a first portion which moves between said light emitting housing and said light receiving body, and a second portion which is oriented at an angle to the first portion.

2. The device of claim 1, further comprising a shadow rod sleeve for enclosing at least a middle portion of said shadow rod to thereby guide movement of the shadow rod first portion in the desired direction.

3. The device of claim 1, further comprising means for restricting relative movement between the flexible shadow rod and the sleeve.

4. The device of claim 3, wherein said restricting means comprises a collar secured to the flexible rod adjacent its first portion, said collar having a surface against which the sleeve abuts.

5. The device of claim 1, wherein said flexible shadow rod is made from a resilient light impermeable material.

6. An optical displacement transducer, comprising,
  a light emitting means for emitting a light flow, comprising a housing having an internal chamber formed therein, a light source positioned inside the chamber, and a translucent face formed in a portion of the light emitting housing for channelling the light flow from the light emitting housing;
  a light receiving means for receiving the light flow mounted opposite the housing, said light receiving means comprising a light receiving body having an internal chamber formed therein for retaining a light sensor, said light receiving body being provided with a translucent face in a portion thereof which is oriented in substantially parallel relationship to the light emitting housing translucent face; and
  a flexible light blocking means for intermittently blocking the light flow between the light source and the light sensor and for varying the amount of light reaching the light sensor, said light blocking means comprising a flexible, resilient shadow rod having a first portion which moves between said light emitting housing and said light receiving body, and a second portion which is oriented at an angle to the first portion, said light emitting means further comprising a sleeve for enclosing at least a middle portion of said shadow rod to thereby guide movement of the shadow rod first portion in the desired direction.

7. The device of claim 6, further comprising means for preventing relative movement between the shadow rod and the sleeve, said restricting means comprising a collar fixedly attached to the shadow rod adjacent its first portion, said collar forming an abutting surface for the sleeve.

8. An optical displacement transducer, comprising:
  a light emitting means for emitting a light flow, comprising a light emitting housing, having an internal chamber formed therein, a light source positioned inside the chamber, and a translucent face formed in a portion of the light emitting housing for channelling the light flow from the light emitting housing;
  a light receiving means for receiving the light flow mounted opposite the light emitting housing, said light receiving means comprising a light receiving body having an internal chamber formed therein for retaining a light sensor, said light receiving body being provided with a translucent face in a portion thereof which is oriented in a substantially parallel relationship to the light emitting housing translucent face;

a light blocking means for intermittently blocking the light flow mounted between the light emitting housing and the light receiving body, said light blocking means comprising a light impermeable member movable in a linear direction; and means for channelling the light flow at an angle in relationship to a longitudinal axis of the light emitting housing.

9. The device of claim 8, wherein said means for channeling the light flow comprises a curved end wall formed at one end of the light emitting housing adjacent said translucent face, said curved wall forcing the light flow to change its substantially linear travel path to a curved flow path.

10. The device of claim 8, wherein said light blocking means comprises a light impermeable shadow rod having an opening made therein, said opening allowing the light flow to travel from the light emitting housing to the light receiving body when said opening is aligned with translucent faces of the light emitting housing and the light receiving body, while at least a portion of the light flow is blocked by the shadow rod.

11. The device of claim 8, wherein said means for channelling the light flow comprises a curved wall formed in one end of said light receiving body adjacent said translucent face, said curved wall forcing the light flow to change its substantially linear travel path to a curved flow path.

12. The device of claim 8, wherein said means for channeling the light flow comprises a curved wall formed in one end of said light receiving body adjacent its translucent face and a curved wall formed in one end of said light emitting housing adjacent its translucent face, said curved walls forcing the light flow to change its substantially linear travel path to a curved flow path.

13. The device of claim 8, wherein said means for channeling the light flow comprises an angular end wall formed in the light emitting housing adjacent said translucent face, said end wall being oriented at an angle to a longitudinal axis of the light emitting housing.

14. The device of claim 8, wherein said means for channeling the light flow comprises an angular end wall formed in said light receiving body adjacent said translucent face, said angular end wall being oriented at an angle to a longitudinal axis of the light receiving body.

15. The device of claim 8, wherein said means for channelling the light comprises an angular wall formed in an end of said light emitting housing adjacent said translucent face and an angular end wall formed in an end of said light receiving body adjacent the translucent face of the light receiving body, said angular end walls forcing the light flow to change its travel path when passing along said angular end walls.

16. The device of claim 8, wherein said means for channelling the light flow comprises a quarter-spherical wall formed in that portion of the light emitting housing adjacent the translucent face, said quarter-spherical wall causing the light flow to change its travel path to a curved flow when passing along said quarter-spherical wall.

17. The device of claim 8, wherein said means for channelling the light flow comprises a quarter-spherically-shaped wall formed in that end of the light receiving body adjacent the translucent face, said quarter-spherically-shaped wall causing the light flow to change its travel path when passing along said quarter-spherically-shaped wall.

18. The device of claim 8, wherein said means for channeling the light flow comprises a quarter-spherically-shaped end wall formed in that portion of the light emitting housing adjacent said translucent face and a quarter-spherically-shaped end wall made in that portion of the light receiving body adjacent the translucent face of the light receiving body, said end walls facilitating channeling of the light in the desired direction.

19. The device of claim 8, wherein said light impermeable member comprises a spiral disk having a spiral window made therein for allowing at least a portion of the light flow to pass the light receiving body.

20. The device of claim 19, wherein said spiral disk is provided with means for receiving a torque from an external source of rotation, said torque receiving means comprising a rod which extends at a right angle to a normal axis of the disk and which is fixedly attached to the disk.

21. The device of claim 18, wherein said light emitting housing and said light receiving body each have a semi-circular cross section.

22. The device of claim 18, wherein said light emitting housing and said light receiving body each have at least a portion which is substantially light permeable to facilitate a total internal reflection.

23. The device of claim 8, further comprising a light impermeable cover sized and shaped to cover at least a portion of a non-translucent exterior surface of the housing.

24. The device of claim 8, further comprising a light impermeable cover for covering at least a portion of a non-translucent exterior surface of the light receiving body.

25. The device of claim 8, further comprising a pair of covers, each cover being sized and shaped to cover at least a portion of a non-translucent exterior surface of the corresponding light receiving body and of the light emitting housing.

26. The device of claim 8, wherein said means for channeling the light flow comprises a curved wall formed in a portion of the light emitting housing adjacent the translucent face of the light emitting housing, and a curved wall formed at an end of the light receiving body adjacent the translucent face of the light receiving body, said light emitting housing and light receiving body being mounted in such a manner that their respective translucent faces are misaligned in relationship to each other, so as to produce a generally Z-shaped light flow traveling from the light source to the light sensor.

27. An optical displacement transducer, comprising:

a light emitting means for emitting a light flow, comprising a light emitting housing having an internal chamber formed therein, a light source positioned inside the chamber, and a translucent face formed in a portion of the housing for channelling the light flow from the housing, said light emitting housing having an elongated body having a generally rectangular solid shape and having a curved end wall adjacent said translucent face for causing at least a portion of the light flow to turn at an obtuse angle in relationship to a longitudinal axis of the light emitting housing and thereby facilitate channeling of the light exiting the light emitting housing;

a light receiving means for receiving the light flow mounted opposite said light emitting housing, said light receiving means comprising a light receiving body having an internal chamber formed therein for retaining a light sensor, said light receiving body being provided with a translucent face in a portion thereof which is located in a substantially parallel relationship to the translucent face of the light emitting housing; and a light blocking means for intermittently blocking the light flow and varying the amount of light reaching the light sensor.

28. The device of claim 27, wherein said light blocking means comprises an elongated light impermeable body having a window made therein for allowing at least a portion of light to travel from the light source to the light sensor.

29. The device of claim 27, wherein said light receiving body comprises an elongated, generally rectangular solid body having a curved end wall, said end wall causing at least a portion of the light flow to turn at an angle when entering the light receiving body and thereby facilitate channeling of the light flow in the desired direction.

30. An optical displacement transducer, comprising:
a light emitting means for emitting a light flow, comprising a light emitting housing having an internal chamber formed therein, a light source positioned inside the chamber, and a translucent face formed in a portion of the housing for channelling the light flow from the housing, said light emitting housing having an elongated body having a generally rectangular solid shape and having an end wall extending at an angle in relationship to a longitudinal axis of the housing adjacent said translucent face for causing the light flow to turn at an angle in relationship to the longitudinal axis of the light emitting housing and thereby facilitate channeling of the light leaving the light emitting housing;

a light receiving means for receiving the light flow mounted opposite the housing, said light receiving means comprising a light receiving body having an internal chamber formed therein for retaining a light sensor, said light receiving body being provided with a translucent face in a portion thereof which is located in a substantially parallel relationship to the translucent face of the light emitting housing; and a light blocking means for intermittently blocking the light flow and varying the amount of light reaching the light sensor.

31. The device of claim 30, wherein said light receiving body comprises an elongated, generally rectangular solid body having an end wall extending at an angle in relationship to a longitudinal axis of the body, said end wall causing at least a portion of the light flow to turn at an angle when entering the light receiving body to facilitate channeling of the light flow in the desired direction.

32. An optical displacement transducer, comprising:
a light emitting means for emitting a light flow, comprising a light emitting housing having an internal chamber formed therein, a light source positioned inside the chamber, and a translucent face formed in a portion of the housing for channelling the light flow from the housing, said light emitting housing having an elongated body having a generally rectangular solid shape and having a quarter-spherical end wall adjacent said translucent face for causing the light flow to curve its travel path when passing along said end wall;

a light receiving means for receiving the light flow mounted opposite the housing, said light receiving means comprising a light receiving body having an internal chamber formed therein for retaining a light sensor, said light receiving body being provided with a translucent face in that portion thereof which is located in a substantially parallel relationship to the translucent face of the light emitting housing; and a light blocking means mounted for rotational movement between the light emitting housing and the light receiving body in a normal path of the light flow to intermittently block the light flow and vary the amount of light reaching the light sensor, said light blocking means comprising a light impermeable spiral disk having a spiral window for channelling the light flow to the light sensor, said spiral disk being provided with means for receiving a torque from an external source of rotation, said torque receiving means comprising a rod fixedly attached to the disk and extending at a right angle to a normal axis of the disk.

33. An optical displacement transducer, comprising:
a light emitting means for emitting a light flow, comprising a light emitting housing having an internal chamber formed therein, a light source positioned inside the chamber, and a translucent face formed in a portion of the housing for channelling the light flow from the housing, said light emitting housing having an elongated, rectangular solid shape and having a quarter-spherical end wall adjacent to the translucent face for causing the light flow to curve its travel path when passing along said end wall and thereby facilitate channeling of the light leaving the light emitting housing;

a light receiving means for receiving the light flow mounted opposite said housing, said light receiving means comprising a light receiving body having an internal chamber formed therein for retaining a light sensor, said light receiving body being provided with a translucent face in a portion thereof which is located in substantially parallel relationship to the translucent face of the light emitting housing; and a light blocking means for intermittently blocking the light flow and varying the amount of light reaching the light sensor, said light blocking means comprising a light impermeable body having a window made therein for permitting at least a portion of the light flow to pass therethrough.

34. The device of claim 33, wherein the non translucent surface of said light emitting housing and said light receiving body is transparent to facilitate total internal reflection.

35. An optical displacement transducer, comprising:
a light emitting means for emitting a light flow, comprising a light emitting housing having an internal chamber formed therein, a light source positioned inside the chamber, and a translucent face formed in a portion of the housing for channelling the light flow from the housing, said light emitting housing having an elongated, generally rectangular solid shape and having a quarter-spherical end wall adjacent said translucent face for causing the light flow to change its travel path when passing along said end wall and thereby facilitate channeling of the light leaving the light emitting housing;

a light receiving means for receiving the light flow mounted opposite the housing, said light receiving means comprising a light receiving body having an internal chamber formed therein for housing a light sensor, said light receiving body being provided with a translucent face in a portion thereof which is located in substantially parallel relationship to the translucent face of the light emitting housing, said light receiving body having an elongated, generally rectangular solid shape and a quarter-spherical end wall adjacent said translucent face of the body for causing the light flow to change its travel path when passing along said end wall of the body, thereby facilitating channelling of the light flow entering said light receiving body; and a light blocking means for intermittently blocking the light flow and varying the amount of light reaching the light sensor, said light blocking means comprising a light impermeable body mounted for linear movement between the translucent faces of said light emitting housing an said light receiving body.

36. The device of claim 35, further comprising a pair of light impermeable covers, each cover being sized and shaped for covering at least a portion of the non-reflective surface of the corresponding light emitting housing and the light receiving body.

37. An optical displacement transducer, comprising:
a light emitting means for emitting a light flow comprising a light emitting housing having an internal chamber formed therein, a light source positioned inside the chamber, and a translucent face formed in a portion of the light emitting housing for channelling the light flow from the housing, said housing having a curved end wall for channelling the light at an angle in relationship to a longitudinal axis of the light emitting housing;

a light receiving means for receiving the light flow mounted opposite the light emitting housing, said light receiving means comprising a light receiving body having an internal chamber formed therein for retaining a light sensor, said light receiving body being provided with a translucent face in a portion thereof which is located in a substantially parallel relationship to the light emitting housing translucent face, said light receiving body having a curved wall adjacent said translucent face of the light receiving body, said translucent faces of the light emitting housing and said light receiving body being misaligned, so as to produce a generally Z-shaped light flow from the light source to the light sensor; and a light blocking means for intermittently blocking the light flow and varying the amount of light reaching the light sensor, said light blocking means comprising a light impermeable body having a window made therein for allowing at least a part of the light flow to travel to the light sensor.

38. An optical displacement transducer, comprising:
a light source for emitting a light flow;
a light reflective and diffusive surface for receiving and re-directing the light flow away from the surface;
a light receiving and diffusive surface for receiving the light flow and re-directing the light flow away from the light receiving surface;
a light sensor for receiving the light flow reflected by the light receiving and diffusive surface; and
a light blocking means for intermittently blocking the light flow and varying the amount of light reaching the light sensor.

39. The device of claim 38, wherein said light reflective surfaces are positioned at an angle in relationship to each other.

40. An optical displacement transducer, comprising:
a light source for emitting a light flow;
a light reflective surface for receiving and redirecting the light flow away from the surface;
a light receiving surface for receiving the light flow and re-directing the light flow away from the light receiving surface, wherein said reflective surfaces further comprise a light diffusive means;
a light sensor for receiving the light flow reflected by the light receiving surface; and
a light blocking means for intermittently blocking the light flow and varying the amount of light reaching the light sensor.

41. The device of claim 38, wherein said light blocking means is a light impermeable body moving in a linear direction between said reflective surfaces.

42. A tactile sensing device, comprising:
a rigid frame;
a flexible, resilient capsule carried by said frame, said capsule forming a fluid-tight enclosure with said rigid frame; and
an optical displacement transducer mounted within said enclosure for detecting the direction and amount of force applied to said capsule.

43. The device of claim 42, wherein said enclosure defines and interior chamber, and wherein said optical displacement transducer is mounted within said chamber.

44. The device of claim 42, wherein said rigid frame carries a means for supporting the optical displacement transducer within said enclosure.

45. The device of claim 42, wherein said optical displacement transducer comprises a light emitting means for emitting a light flow, a light receiving means for receiving the light flow mounted opposite the light emitting means, and a light blocking means for intermittently blocking the light flow and varying the amount of light reaching the light receiving means.

46. The device of claim 45, wherein said light emitting means comprises a light source and the light receiving means comprises a light sensor.

47. The device of claim 42, wherein said rigid frame forms a generally cup-shaped chamber, and wherein a spring loaded piston is mounted within said chamber, said piston moving in response to a change in pressure within said enclosure.

48. The device of claim 42, wherein one end of said light blocking means engages an interior surface of said capsule, such that application of force on an exterior surface of the capsule causes movement of the light blocking means and change in the amount of light flow reaching the light sensor.

49. The device of claim 43, wherein said rigid frame carries a means for supporting the optical displacement transducer within the interior chamber, said supporting means comprising a pair of spaced-apart longitudinal plates on which said optical displacement transducer is mounted, at least one flexible resilient layer mounted between said supporting plates and the interior surface of said capsule.

50. The device of claim 49, wherein said optical displacement transducer comprises a light emitting means for emitting a light flow, a light receiving means for receiving the light flow mounted opposite said light emitting means, and a light blocking means for intermittently blocking the light flow and thereby varying the amount of light reaching the light receiving means.

51. The device of claim 50, wherein said at least one flexible resilient layer is provided with an opening through which at least a portion of said light blocking means extends and contacts an interior surface of the capsule, such that application of force on an exterior surface of the capsule causes the light blocking means to move an block at least a portion of the light flow travelling towards said light receiving means.

* * * * *